(12) United States Patent
Lee et al.

(10) Patent No.: US 7,760,932 B2
(45) Date of Patent: Jul. 20, 2010

(54) METHOD FOR RECONSTRUCTING THREE-DIMENSIONAL STRUCTURE USING SILHOUETTE INFORMATION IN TWO-DIMENSIONAL IMAGE

(75) Inventors: Jae-Kwang Lee, Daejon (KR); Chang-Joon Park, Daejon (KR); In-Ho Lee, Daejon (KR); Hyun-Bin Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 995 days.

(21) Appl. No.: 11/511,732

(22) Filed: Aug. 29, 2006

(65) Prior Publication Data

US 2007/0133865 A1  Jun. 14, 2007

(30) Foreign Application Priority Data

Dec. 9, 2005  (KR) .................. 10-2005-0121171

(51) Int. Cl.
  *G06K 9/00* (2006.01)
  *G06T 17/00* (2006.01)
(52) U.S. Cl. .................... 382/154; 345/424
(58) Field of Classification Search ............ 382/154; 345/424

See application file for complete search history.

(56) References Cited

U.S. PATENT DOCUMENTS

| | | | |
|---|---|---|---|
| 6,084,979 A | 7/2000 | Kanade et al. | |
| 6,563,499 B1 * | 5/2003 | Waupotitsch et al. | ....... 345/420 |
| 6,775,401 B2 | 8/2004 | Hwang et al. | |
| 6,930,682 B1 | 8/2005 | Livingston | |
| 7,209,136 B2 * | 4/2007 | Grau | .......................... 345/419 |
| 7,257,237 B1 * | 8/2007 | Luck et al. | .................. 382/103 |
| 2003/0052875 A1 * | 3/2003 | Salomie | ...................... 345/419 |

FOREIGN PATENT DOCUMENTS

JP  2003-099800  4/2003

(Continued)

OTHER PUBLICATIONS

'Image-Based Visual Hulls' Matusik et al., Laboratory for Computer Science Massachusetts Institute of Technology et al.
'Shape-From-Silhouette Across Time Part I: Theory and Algorithms', Cheung et al., The Robotics Institute, Carnegie Mellon University.
Korean Patent Grant dated May 4, 2007 corresponding to Korean application No. 10-2005-0121171.

*Primary Examiner*—Brian P Werner
*Assistant Examiner*—Michael Vanchy, Jr.
(74) *Attorney, Agent, or Firm*—Ladas & Parry LLP

(57) ABSTRACT

A method for reconstructing a three-dimensional structure using silhouette information on a two-dimensional plane is provided. The method includes: obtaining silhouette images; creating a cube on a three-dimensional space using the silhouette images; calculating vertex coordinates on a two-dimensional image plane by projecting eight vertices of the three-dimensional cube on a two-dimensional image plane of a first camera; dividing into multiple inner voxels by dividing sides formed by the eight vertices by a divider; dividing into a predetermined number of regions by dividing sides connecting the coordinates by a predetermined divider; assigning indices by matching cubes of the three-dimensional cube to square regions on the two-dimensional image plane in one to one manner; storing indices of regions where the square regions meets with a first silhouette image; and reconstructing three-dimensional structure by finding common indices through repeatedly performing the steps using other silhouette images.

7 Claims, 7 Drawing Sheets

FOREIGN PATENT DOCUMENTS

| | | |
|---|---|---|
| JP | 2004-070792 | 3/2004 |
| JP | 2004-078431 | 3/2004 |
| JP | 102004 0055310 | 6/2004 |
| KR | 100507780 | 6/2004 |
| KR | 1020040055310 | 6/2004 |
| KR | 10-2004-0083755 | 10/2004 |
| KR | 10-0513055 | 8/2005 |
| WO | WO2004/114649 | 12/2004 |

* cited by examiner

FIRST CAMERA(12)
THIRD CAMERA(14)
11
SECOND CAMERA(13)

METHOD FOR RECONSTRUCTING THREE-DIMENSIONAL STRUCTURE USING SILHOUETTE INFORMATION IN TWO-DIMENSIONAL IMAGE

FIELD OF THE INVENTION

The present invention relates to a method for reconstructing a three dimensional structure using silhouette information in a two-dimensional image; and, more particularly, to a method for reconstructing a three-dimensional structure using silhouette information in a two-dimensional image by creating a cube on a three dimensional space after extracting silhouette information from images captured through a plurality of cameras and projecting eight vertices of the three-dimensional cube on an image plane.

DESCRIPTION OF RELATED ART

In an embodiment of the present invention, three cameras are used. However, the present invention is not limited by the number of the cameras.

In order to develop technology for reconstructing a three-dimensional object, many researches have been conducted on reconstructing or recognizing the structure of a real scene or the shape of an object in a robot vision system or a machine vision system. The three-dimensional object reconstructing technique is classified into two major schemes as follows.

One uses specialized equipment such as a range scanner, a structured light pattern or a depth camera, and the other uses general equipment such as a charge coupled device (CCD) camera. As a three-dimensional object reconstructing method using general equipment, there are stereo matching, depth from focus/defocus, shape from motion, shape from silhouette and shape from shading.

If a three-dimensional structure is reconstructed using the specialized equipment, the three-dimensional structure of a target object will be reconstructed accurately. However, it is very difficult to reconstruct the three-dimensional structure of a moving object in real-time. Due to such a difficulty, the three-dimensional object reconstructing method using general equipment such as a CCD camera has been actively studied.

Among three-dimensional object reconstructing algorithms for a real-time system, a reconstructing method using silhouette image has been widely used because the silhouette image is easy to capture in an indoor place where cameras are placed at the fixed locations, and it is comparatively easy to implement.

A method for reconstructing a structure on a three-dimensional space from a silhouette image is called "shape from silhouette", and a set of voxels on a reconstructed three-dimensional space is called 'visual hull'. The voxel is a portmanteau of the words volumetric and pixel. The voxel is a volume element representing a value in a three dimensional space.

The most widely used method for reconstructing the visual hull is Voxel Carving which is introduced in an article by W. Matusik et al., entitled "Image-Based Visual Hulls," In *Proc. Of SIGGRAPH* 2000, pp. 369-374.

The Voxel Carving method reconstructs a three-dimensional structure by creating a three-dimensional virtual cube in a three-dimensional space and carving non-silhouette regions thereof by backwardly projecting the silhouette of silhouette image. That is, the silhouette regions, inner voxel, are not carved.

The resolution of a three-dimensional object reconstructed by Voxel Carving is decided by the number of cameras as introduced in an article by K. M. Cheung, entitled "Shape from Silhouette Across Time", *IJCV* 2005, Vol. 62, No. 3, May 2005, pp. 221-247.

Therefore, it is essential to improve the speed of calculating in order to quickly obtain a detailed three-dimensional object in real-time.

In order to improve the speed of calculating, a method of reducing computation amount was introduced in an article by W. Matusik, et al., entitled "Polyhedral Visual Hulls for Real-Time Rendering," *In Proc. Of the 12th Equrographics Workshop on Rendering*, 2001. In this convention method, edges of silhouette are extracted, and the voxel carving is performed by backwardly projecting the extracted edges only.

However, the conventional voxel carving methods still require mass amount of computation and a long processing time because it must calculate an inverse matrix that is created when the silhouette is backwardly projected on a three-dimensional space.

SUMMARY OF THE INVENTION

It is, therefore, an object of the present invention to provide a method for reconstructing a three-dimensional structure using silhouette information on a two-dimensional image plane in order to quickly reconstruct the three-dimensional structure with the small amount of computation by creating a cube on a three-dimensional space after extracting silhouette information from an image captured from a plurality of cameras and calculating a three-dimensional structure on a two-dimensional plane through projecting eight vertices of the three-dimensional cube on an image plane.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a method for reconstructing a three-dimensional structure using silhouette information on a two-dimensional plane, including the steps of: a) obtaining silhouette images corresponding to each of cameras; b) creating a cube on a three-dimensional using the obtained silhouette images; c) calculating vertex coordinates on a two-dimensional image plane by projecting eight vertices of the created three-dimensional cube on a two-dimensional image plane of a first camera; d) dividing into a predetermined number of inner voxels by dividing sides connecting the eight vertices of the three-dimensional cube by a predetermined divider, where the inner voxels are cube regions; e) dividing into a predetermined number of regions by dividing sides connecting the coordinates of the two-dimensional image plane by a predetermined divider, where the regions are cube regions; f) assigning indices by matching cubes of the three-dimensional cube to square regions on the two-dimensional image plane in one to one manner, where the square region is a region including a cube; g) storing indices of regions where each of the square regions meets with a first silhouette image; and h) reconstructing a three-dimensional structure by finding common indices through repeatedly performing the steps a) to g) using corresponding silhouette images of remained cameras.

In accordance with an aspect of the present invention, there is also provided a method for reconstructing a three-dimensional structure using silhouette information on a two-dimensional plane, including the steps of: a) obtaining silhouette images corresponding to each of cameras; b) creating a cube on a three-dimensional using the obtained silhouette images; c) calculating vertex coordinates on a two-dimensional image plane by projecting eight vertices of the created three-dimensional cube on a two-dimensional image plane of a first camera; d) dividing into 64 inner voxels by dividing sides connecting the eight vertices of the three-dimensional cube by four, where the inner voxels are cube regions; e) dividing into 64 regions by dividing sides connecting the coordinates of the two-dimensional image plane by four, where the regions are cube regions; f) assigning indices by matching cubes of the three-dimensional cube to square regions on the two-dimensional image plane in one to one manner, where the square region is a region including a cube; g) storing indices of regions where each of the square regions meets with a first silhouette image; h) reconstructing a first three-dimensional structure by finding a first common index through repeatedly performing the steps a) to g) using corresponding silhouette images of remained cameras; i) dividing into 8 inner voxels by dividing each side of a cube of the three-dimensional cube corresponding to the first common index by two, where the inner voxels are cube regions; j) dividing into 8 regions by dividing each side of a cube of the two-dimensional image plane corresponding to the first common index by two, where the regions are cube regions; k) assigning indices by matching each cube of the three-dimensional cube to each square region on the two-dimensional image plane in one to one manner; and l) reconstructing a second three-dimensional structure by finding indices of regions where the square regions meet with silhouette images and storing a second common index commonly including the found indices.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
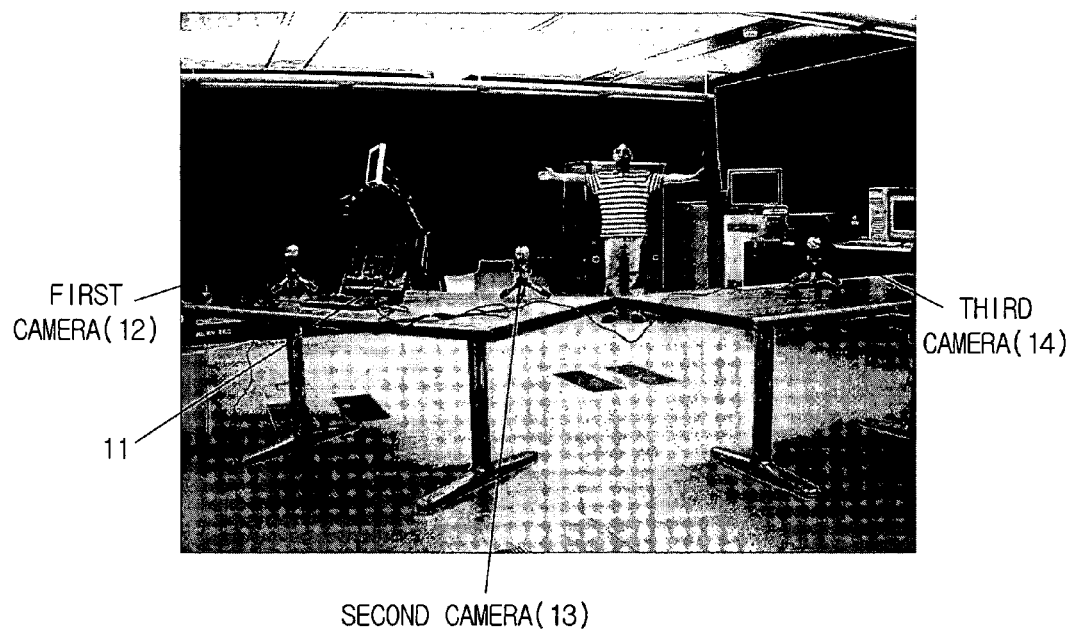
FIG. 1 is a view showing a method for controlling three USB web cameras in a personal computer PC where the present invention is applied.

FIG. 1 is a view showing a method for controlling three USB web cameras in a personal computer PC where the present invention is applied.

The personal computer PC includes at least three universal serial bus (USB) controllers. Each of the USB controllers has a fixed bandwidth. Generally, a USB web camera has about 50 to 70% of bandwidth. Therefore, if three USB web cameras are driven after the three USB web cameras are connected to each of the USB controller, the three USB web cameras can be driven at the same time without exceeding the bandwidth of each of the USB controllers.

That is, the PC receives images from three cameras 1, 2 and 3 in sequence. Since multiple images cannot be obtained at the same time, the PC receives images from the three cameras 1, 2 and 3 in sequence, stores them in a memory buffer, and receives a next frame.

Figure 2:
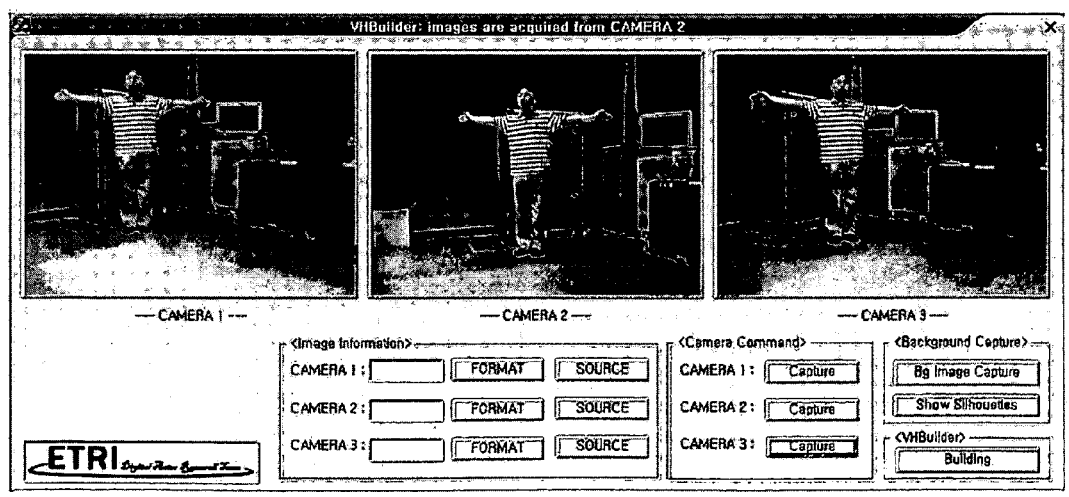
FIG. 2 shows two-dimensional images captured from three USB web cameras.

While the PC processes images stored in the memory buffer, the PC additionally receives images from next three cameras. After receiving all of three images from the cameras, a predetermined image process is performed on the received images in parallel. FIG. 2 shows the two-dimensional images captured from the three USB web cameras.

Figure 3A:
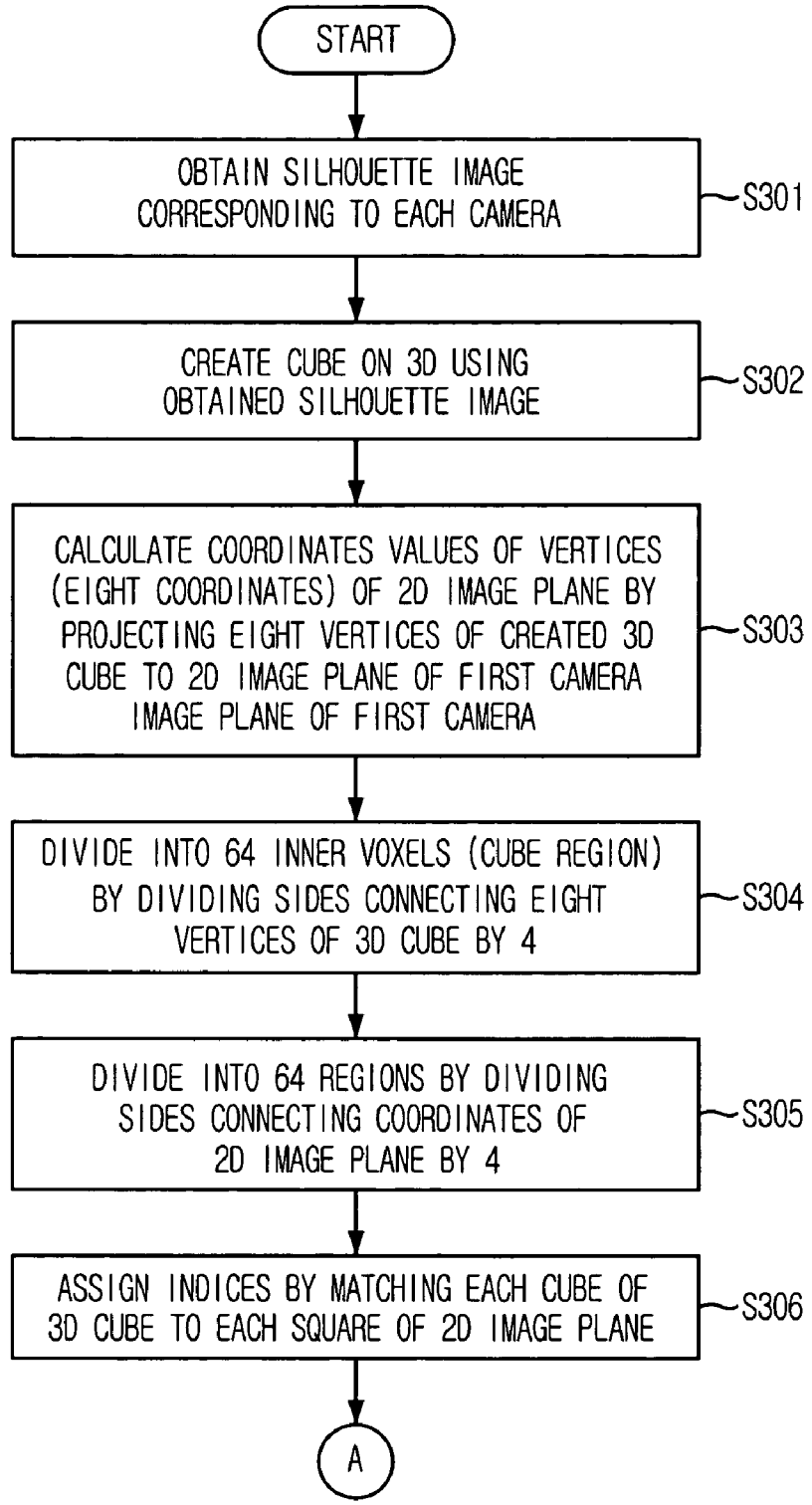
FIGS. 3A and 3B are flowcharts illustrating a method for reconstructing a three-dimensional structure using silhouette information in a two-dimensional in accordance with an embodiment of the present invention.
Figure 3B:
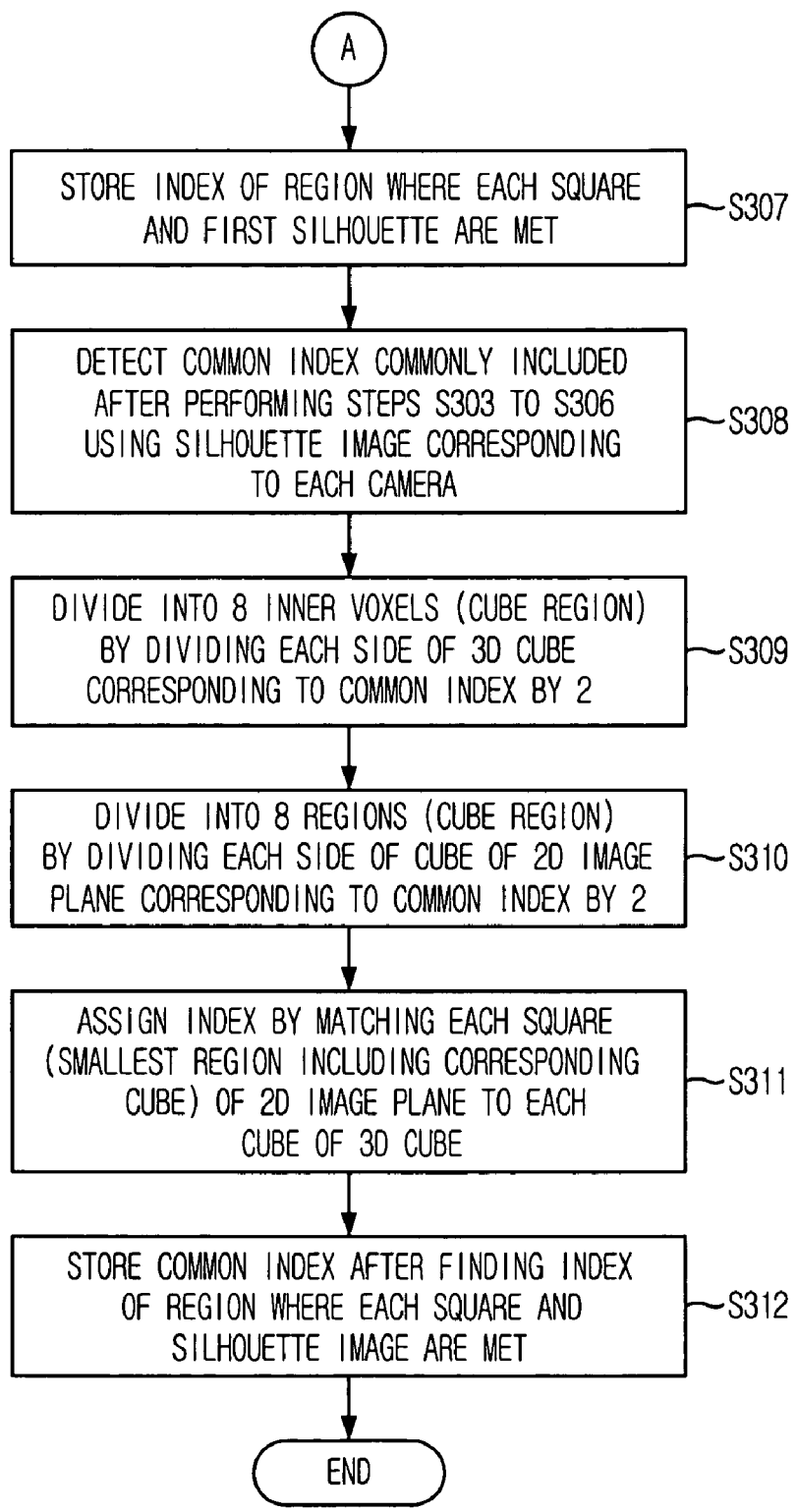

FIGS. 3A and 3B are flowcharts illustrating a method for reconstructing a three-dimensional structure using silhouette information in a two-dimensional in accordance with an embodiment of the present invention.

A background image is captured through three cameras at first. That is, a target object is placed at a predetermined location, and a target object image is captured with the background through three cameras, where the image includes not only the target object but also the background. Then, silhouette images of the three cameras are obtained from the difference image between the target object image and the background image at step S301. That is, a first silhouette image is obtained from a first camera and a second silhouette image is obtained from a second camera. A third silhouette image is obtained from a third camera. In order to reduce influence of noise when the background image is obtained, multiple background images are obtained and then an average and a variance of the obtained background images are calculated.

After calculating the average and the variance, a cube is created on a three-dimensional space using the obtained silhouette images at step S302. That is, the silhouette images are obtained from the images captured from the three cameras, and a square is drawn to surround the silhouette. In order to surround the silhouette, the square is drawn with using a longer one between a width and a length of each image plane as a side thereof. After drawing the square, the cube is created on the three-dimensional space by backwardly projecting four vertices of the square. The size of the silhouette can be detected from the silhouette image. In order to express a reconstructed voxel as a set of small cubes, the square is used. Accordingly, it is possible to use a rectangle or a diamond instead of the square.

After creating the cube, the eight vertices of the three dimensional cube are projected on a two dimensional image of the first camera, and the eight coordinates of the projected vertices on the two dimensional image are obtained at step S303.

At step S304, the sides are drawn by connecting the eight vertices of the three dimensional cube each others, and the sides are divided by four to divide the cube into 64 voxels that are 64 small cube regions at step S304.

Figure 4:
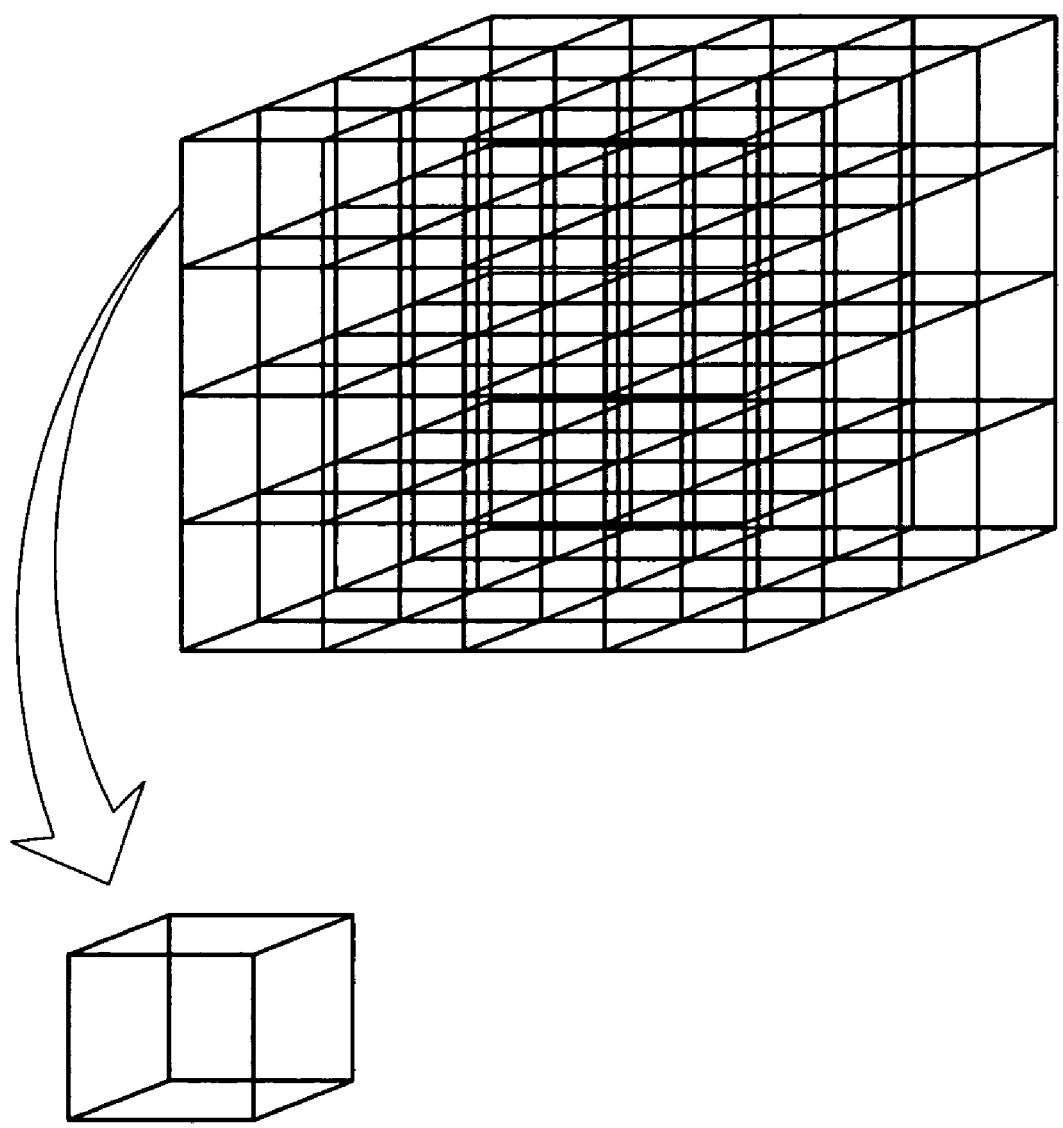
FIG. 4 is a view showing 64 regions created by dividing sides connecting coordinates of two-dimensional image plane by four in accordance with an embodiment of the present invention.

Then, as shown in FIG. 4, each of sides connecting coordinates on two-dimensional image plane is divided by four so as to divide to 64 cube regions at step S305. For example, if the vertices of a first cube among the 64 cubes on the two dimensional image plane are $(X_1, Y_1), (X_2, Y_2), (X_3, Y_3), (X_4, Y_4), (X_5, Y_5), (X_6, Y_6), (X_7, Y_7)$ and $(X_8, Y_8)$, the vertex coordinates of a square that includes the first cube are $(X_{max}, Y_{max}), (X_{min}, Y_{min}), (X_{max}, Y_{min})$, and $(X_{min}, Y_{max})$. Herein, errors generated during drawing the square become reduced as the calculation is performed repeatedly. That is, if the square is continuously reduced, the difference between the region of the cube and the region of the square becomes reduced. Therefore, the influence of the error can be ignored.

Figure 5:
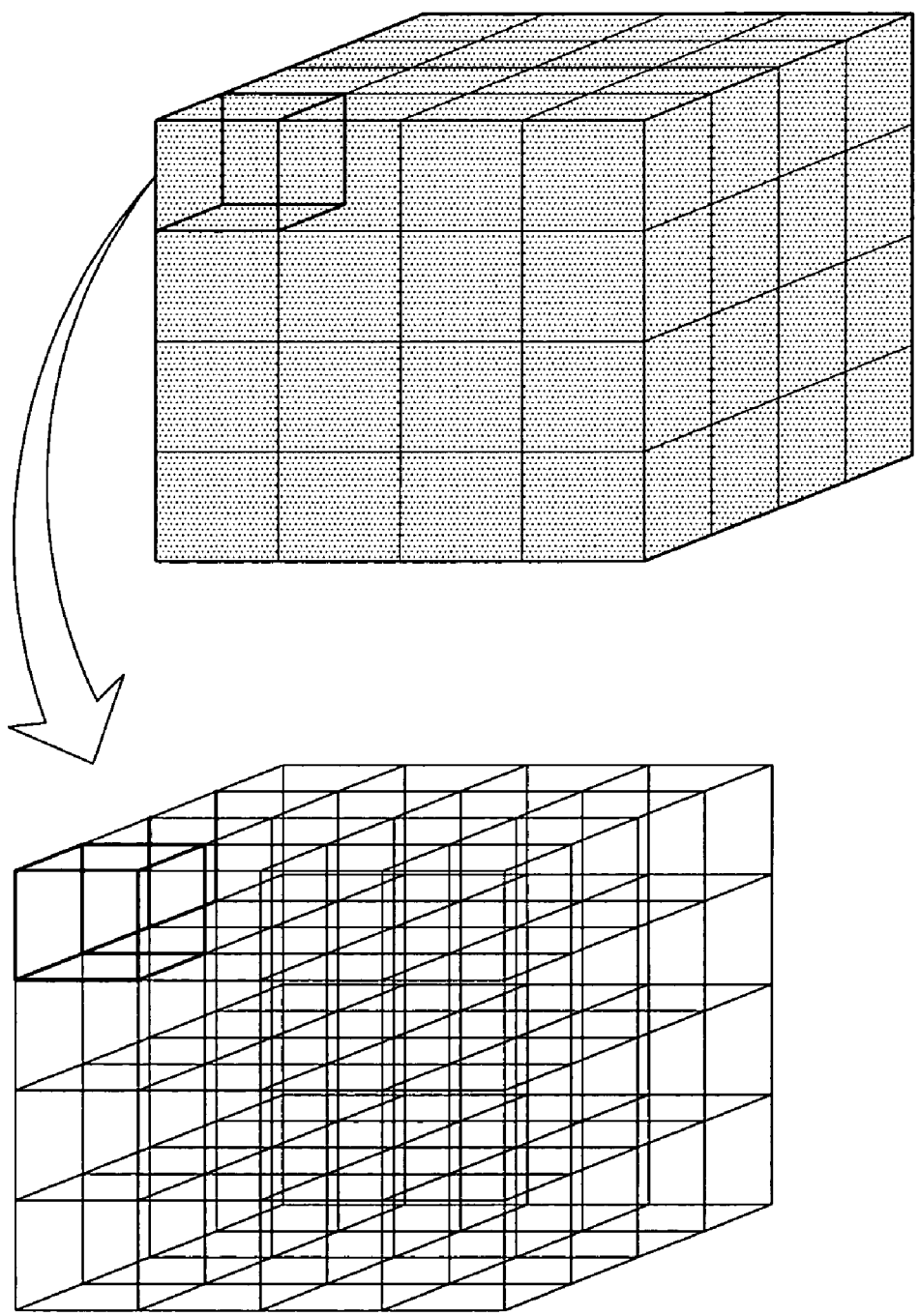
FIG. 5 is a view illustrating matching of each cube of three-dimensional space to each square of two-dimensional image plane in accordance with an embodiment of the present invention.
Figure 6:
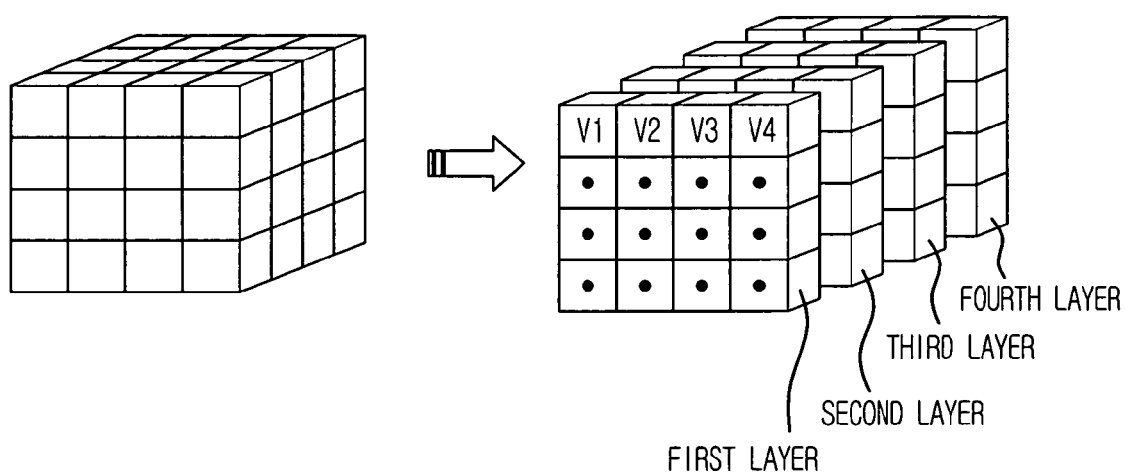
FIG. 6 is a view showing assigning of indices in accordance with an embodiment of the present invention.

Then, as shown in FIG. 5, indices are assigned by matching each cubes of the three-dimensional cube to each square region in the two-dimensional plane in one to one manner at step S306. The indices are assigned to 64 voxels of a first cube in an order from the top to the bottom and the left to the right as shown in FIG. 6. After assigning the index to all of the voxels in a first layer 1, the indices are assigned to voxels in a second layer 2. Then, the indices are assigned to the voxels in a third layer 3 and a fourth layer 4 sequentially.

At step S307, indices of regions where the square regions meet the first silhouette image are stored.

After storing the indices, commonly stored indices are obtained by performing the steps S303 to S306 for other cameras. When the eight vertices of the three-dimensional cube are projected on a two-dimensional image plane of a camera, if the camera is the second camera, the second silhouette image is used to obtain the indices of regions met with each square region. If the camera is the third camera, the third silhouette image is used.

By obtaining the common index, the first reconstructing procedure is completed.

Hereinafter, a second reconstructing procedure will be described.

Each side of the small cube of the three-dimensional cube corresponding to the common index is divided by two so as to divide the small cube into eight voxels at step S309.

Then, each side of the cube on the two-dimensional image plane corresponding to the common index is divided by two so as to divide the cube into eight regions that are eight cube regions at step S309.

By matching each of the cubes of the three-dimensional cube to each of the square regions of the two-dimensional image plane, which is the smallest square region having a corresponding cube, in 1:1 manner, indices are assigned at step S311.

At step S312, common indices are stored by obtaining indices of regions where each square region meets with each silhouette image.

Figure 7:
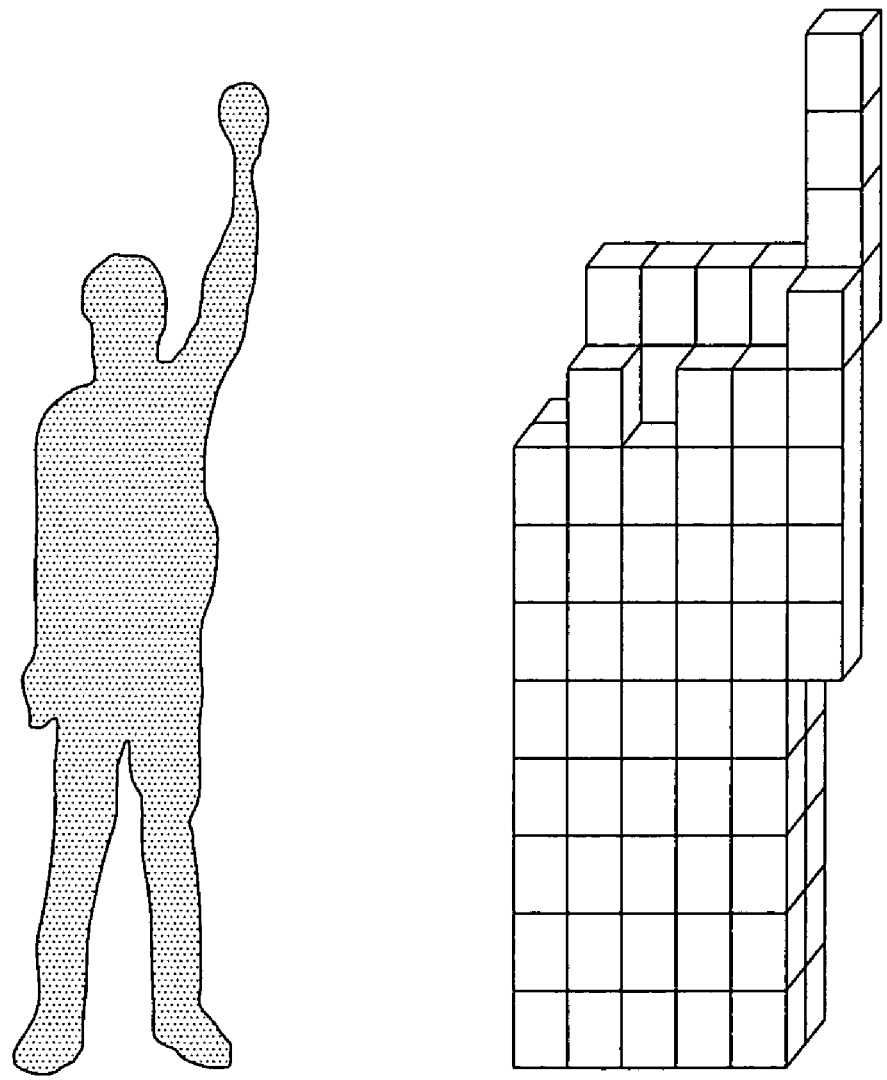
FIG. 7 is a view showing a three-dimensional structure reconstructed using silhouette information on a two-dimensional plane in accordance with an embodiment of the present invention.

The three-dimensional structure reconstructed through the first and second reconstructing procedures is shown in FIG. 7. The three-dimensional structure can be reconstructed more detailed as the second reconstructing procedure is performed repeatedly. Since the amount of computation also increase in proportional to the number of performing the second reconstructing procedure, the number of performing the second reconstructing procedure must be controlled according to its condition.

Herein, it is possible to control the divider that divides the sides connecting the eight vertices of the three-dimensional cube and the sides connecting the coordinates of the two-dimensional image plane.

Hereinafter, this will be described in more detail.

If the projection matrix of a camera is defined as P, the coordinates of a three-dimensional point are defined as X and the coordinates of a point on a two-dimensional image plane are defined as x, Eq. 1 can be given.

$$x = P \cdot X \quad \text{Eq. 1}$$

The three-dimensional coordinates X and the two-dimensional x are homogeneous coordinates and are equivalent to a 4×1 vector and a 3×1 vector, respectively. Also, the projection matrix P is 3×4.

Eq. 1 shows that the three-dimensional coordinates X are linearly projected on the two-dimensional plane by the projection matrix P. That is, when two points on the three-dimensional space are projected by the projection matrix P, the bisection point of the two points on the three-dimensional space is matched to the bisection point of the projected two points on the two-dimensional plane in 1:1 manner.

Using the shown principle, the eight points of the three-dimensional cube are projected to an image plane obtained through a second camera which is set as a reference camera. Then, quarter points are obtained by dividing the sides connecting the projected eight points by four, and regions composed of the quarter points and the projected vertices are determined. That is, an index is set to be correspondent to the voxel on the three-dimensional space.

For first and third cameras, 64 regions composed of quarter points of the projected cube are determined. Then, it determines whether a silhouette image is in the determined region. If the silhouette image is in the divided region, the divided region is selected.

It determines whether a silhouette is crossed with a region on the image plane of the first camera which is corresponding to the selected region. With the index of the crossed region, it checks where a silhouette is crossed or not for the third camera. In order to obtain a target inner voxel, a region that is crossed with the silhouette images of three cameras is obtained, and a corresponding inner voxel is reconstructed.

If the target inner voxel is V, and sets of regions of silhouette on the image planes of the three cameras are Sr1, Sr2 and Sr3, the inner voxel V can be expressed as Eq. 2.

$$V = Sr1 \cap Sr2 \cap Sr3 \quad \text{Eq. 2}$$

The resolution of the inner voxel obtained using the two-dimensional image of the second camera is about $4^3$. In order to obtain a more detailed inner voxel, a region is determined by obtaining a half point from a final result region from the camera 2, it determines whether the silhouette is crossed or not, and this calculation procedure is repeatedly performed for the first camera and the third camera.

As described above, the size of the region becomes reduced by gradually obtaining a half point on the two-dimensional plane, and the detailed level is determined by the size of this region. When the repetition time is N, the resolution is $4^{N+2}$. That is, the resolution is determined in proportional to the repetition time.

If the described procedure is repeatedly performed by increasing the resolution after setting the resolution to be suitable to the application system, a region similar to a silhouette image is created in a two-dimensional plane. By drawing inner voxels on the three-dimensional space to be corresponding to the created regions of two-dimensional image plane, the three-dimensional inner voxel can be reconstructed with complex calculation.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean patent application No. KR 2005-0121171, filed in the Korean patent office on Dec. 9, 2005, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. A method for reconstructing a three-dimensional structure using silhouette information on a two-dimensional plane, comprising the steps of:
   a) obtaining silhouette images, each image corresponding to one of a plurality of cameras;
   b) creating a cube on a three-dimensional space using the obtained silhouette images;
   c) calculating vertex coordinates on a two-dimensional image plane by projecting eight vertices of the created three-dimensional cube on a two-dimensional image plane of a first camera;
   d) dividing into a predetermined number of inner voxels by dividing sides connecting the eight vertices of the three-dimensional cube by a predetermined divider, where the inner voxels are cube regions;
   e) dividing into a predetermined number of regions by dividing sides connecting the coordinates of the two-dimensional image plane by a predetermined divider, where the regions are cube regions;
   f) assigning indices by matching cubes of the three-dimensional cube to square regions on the two-dimensional image plane in a one to one manner, where the square region is a region including a cube;
   g) storing indices of regions where each of the square regions meets with a first silhouette image; and
   h) reconstructing a three-dimensional structure by finding common indices through repeatedly performing the steps a) to g) using corresponding silhouette images of the remaining cameras.

2. The method as recited in claim 1, wherein the predetermined divider is four and the predetermined number of the regions or the inner voxel is 64.

3. The method as recited in claim 1, wherein step a) includes obtaining the silhouette image by obtaining background images through each of the cameras, obtaining object images with the background included by placing an object, and obtaining a difference between the background image and the object image, and wherein in order to reduce influence of noise when the background image is obtained, an average and a variance are calculated after obtaining a plurality of the background images.

4. The method as recited in claim 3, wherein step b) includes creating the cube on the three-dimensional space by drawing a square by using the longer of a width and a length of each image plane as a side thereof to surround the silhouette, and backwardly projecting four vertices of the square.

5. The method as recited in claim 4, wherein step f) includes assigning the indices to inner voxels of the three-dimensional cube in an order of layers, from the top to the bottom and from the left to the right.

6. A method for reconstructing a three-dimensional structure using silhouette information on a two-dimensional plane, comprising the steps of:
   a) obtaining silhouette images, each image corresponding to one of a plurality of cameras;
   b) creating a cube on a three-dimensional space using the obtained silhouette images;
   c) calculating vertex coordinates on a two-dimensional image plane by projecting eight vertices of the created three-dimensional cube on a two-dimensional image plane of a first camera;
   d) dividing into 64 inner voxels by dividing sides connecting the eight vertices of the three-dimensional cube by four, where the inner voxels are cube regions;
   e) dividing into 64 regions by dividing sides connecting the coordinates of the two-dimensional image plane by four, where the regions are cube regions;
   f) assigning indices by matching cubes of the three-dimensional cube to square regions on the two-dimensional image plane in a one to one manner, where the square region is a region including a cube;
   g) storing indices of regions where each of the square regions meets with a first silhouette image;
   h) reconstructing a first three-dimensional structure by finding a first common index through repeatedly performing the steps a) to g) using corresponding silhouette images of the remaining cameras;
   i) dividing into 8 inner voxels by dividing each side of a cube of the three-dimensional cube corresponding to the first common index by two, where the inner voxels are cube regions;
   j) dividing into 8 regions by dividing each side of a cube of the two-dimensional image plane corresponding to the first common index by two, where the regions are cube regions;
   k) assigning indices by matching each cube of the three-dimensional cube to each square region on the two-dimensional image plane in a one to one manner, and
   l) reconstructing a second three-dimensional structure by finding indices of regions where the square regions meet with silhouette images and storing a second common index commonly including the found indices.

7. The method as recited in claim 6, wherein step l) is repeatedly performed a number of times set by a user.

* * * * *